United States Patent [19]

Okamura

[11] Patent Number: 5,442,800
[45] Date of Patent: Aug. 15, 1995

[54] PARALLEL INPUT-OUTPUT CIRCUIT PERMITTING REDUCE NUMBER OF PINS IN A SINGLE CHIP MICROCOMPUTER

[75] Inventor: Atsushi Okamura, Tokyo, Japan

[73] Assignee: NEC Corporation, Tokyo, Japan

[21] Appl. No.: 67,842

[22] Filed: May 27, 1993

[30] Foreign Application Priority Data

May 27, 1992 [JP] Japan .................................. 4-135105

[51] Int. Cl.6 ............................................ G06F 13/00
[52] U.S. Cl. ................................ 395/800; 364/238.1; 364/244.4; 364/247; 364/260.1; 364/DIG. 1
[58] Field of Search ...................... 395/800, 275, 825.03

[56] References Cited

U.S. PATENT DOCUMENTS

| | | | |
|---|---|---|---|
| 4,627,046 | 12/1986 | Bellamy | 370/58 |
| 4,714,922 | 12/1987 | Cripps | 340/825.03 |
| 4,833,605 | 5/1989 | Terada | 395/400 |
| 4,851,834 | 7/1989 | Stockebrand | 345/189 |
| 5,005,151 | 4/1991 | Kurkowski | 341/100 |

Primary Examiner—Eric Coleman
Attorney, Agent, or Firm—Young & Thompson

[57] ABSTRACT

A single chip microcomputer has a parallel input-output port. The port comprises: an external input shift register with a parallel input port; an external output shift register with a parallel output port having a latch circuit; and a plurality of internal port units coupled in series to each other. Each of the plural port internal units comprises a data register and a shift register coupled to the data register, the data register being coupled to an internal bus. A serial input device couples the external output shift register with the shift register in the internal port unit existing at a terminal point of the internal port series; whereas a serial output device couples the external input shift register with each of the shift registers in the internal port units. A control circuit coupled to both the external input and output shift registers controls shift performances of the external input and output shift registers.

2 Claims, 7 Drawing Sheets

FIG.2 *PRIOR ART*
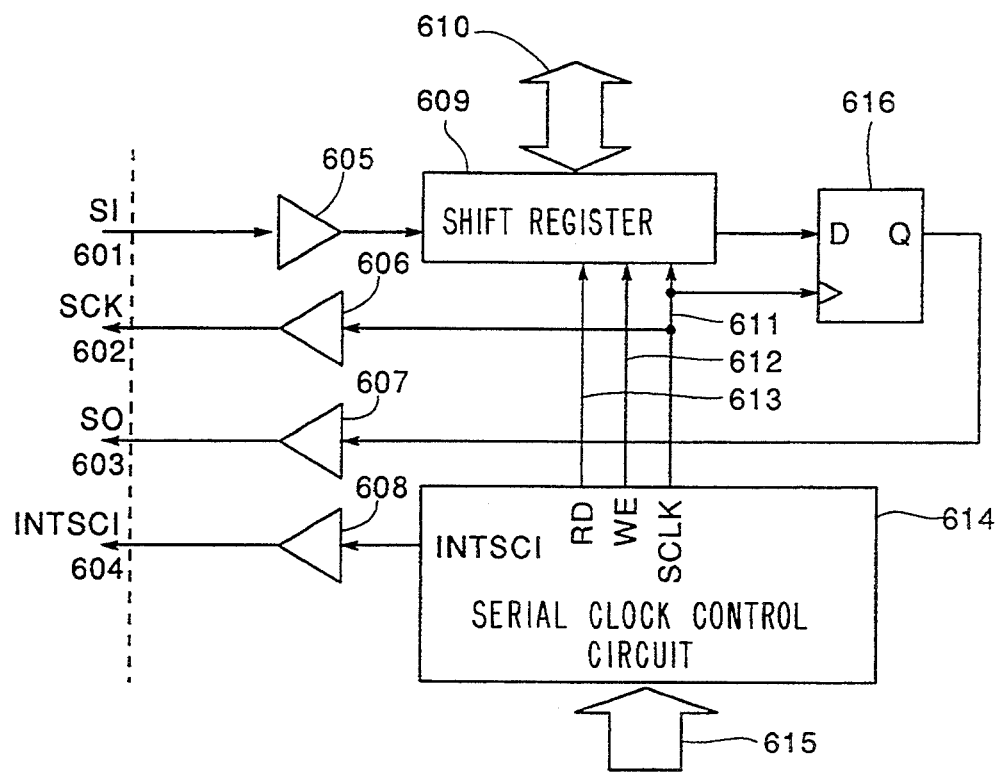
FIG.3 *PRIOR ART*
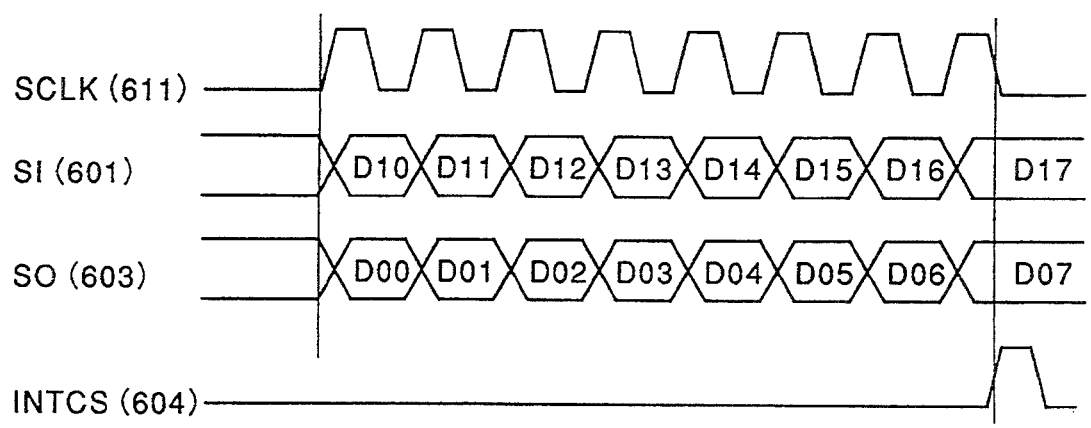

PARALLEL INPUT-OUTPUT CIRCUIT PERMITTING REDUCE NUMBER OF PINS IN A SINGLE CHIP MICROCOMPUTER

BACKGROUND OF THE INVENTION

The invention relates to a single chip microcomputer, and more particularly to a single chip microcomputer having an improved parallel transmission feature and thus an improved parallel input-output port.

A great number of single chip microcomputers are widely used in the field of computers due to a low cost, a high reliability and a low power consumption. In the general single chip microcomputers, a single chip has an integration of a processing unit, storage devices and input-output units as well as interfaces and the like. In various single chip microcomputers, well known in the art is a single chip microcomputer utilizing a parallel data transmission which implements a simultaneous transmission of a plurality of bits making up a character through a plurality of separated transmission lines. Such the parallel data transmission is applicable to input and-/or output ports for access to external devices. A typical one of the single chip microcomputers including a parallel input-output port will be described with reference to FIGS. 1, 2 and 3.

In FIG. 1, the single chip microcomputer 501 includes a clock oscillation circuit 502, a processing unit 503, an interrupt control unit 504, a parallel input-output port 506, a timer circuit 508, a read only memory (a ROM) 510, a random access memory (RAM) 512 and an external bus interface 514 as well as an address bus 516 and a data bus 517. The single chip microcomputer 501 is supplied with a power from a power supply 519 for its driving and is coupled to a ground 520. The clock oscillatory circuit 502 is coupled with a quartz oscillator 518, which generates clock signals used for the synchronous data processing, so as to receive clock signals from the quartz oscillator 518 and then supply the clock signal to the central processing unit for its synchronous data processing.

The processing unit 503 for executing data processing includes circuits which control the interruption of instructions and their executions. The processing unit 521 is coupled to the interrupt control unit 504 for interruption of instructions and their executions. The processing unit 503 is coupled to an address output line 527 which connects with the address bus 516 for delivering informations of address to the address bus 516. The processing unit 503 is also coupled to a control signal input-output line 528 which connects with the address bus 516. The processing unit 503 is also coupled to a data input-output line 529 which connects with the data bus 517. The processing unit 503 is thus accessible to the random access memory 512 and the read only memory 510 through the address bus 516 and the data bus 517.

The interrupt control unit 504 has a plurality of external interrupt input terminals 521 for receipt of an interrupt request signal generated in external devices such as external memory devices. The interrupt control unit 504 is coupled to the address bus 516 through a decoder 505 for receipt of decoded signals. The interrupt control unit 504 is also coupled to the address bus 516 through an address input line 530 for obtaining address information which specifies a storage device is requesting the interruption. The interrupt control unit 504 is also coupled to the data bus 517 through a data input-output line 531.

The parallel input-output port 506 has a plurality of sets of parallel input-output terminals 522 through which the parallel data transmission to external devices is implemented. The parallel input-output port 506 is coupled to the address bus 516 through a decoder 507 for receipt of decoded signals. The parallel input-output port 506 is also coupled to the address bus 516 through an address input line 532. The parallel input-output port 506 is also coupled to the data bus 517 through a data input-output line 533.

The timer circuit 508 is coupled to timer control signal input-output lines 523 for defining a specific time duration and also coupled to the address bus 516 through a decoder 509. The timer circuit 508 is coupled to the address bus 516 through an address input line 543 and further coupled to the data bus 517 through a data input-output line 535.

The read only memory (ROM) 510 is to store instructions to be executed by the processing unit 503. The read only memory 510 is coupled to the address bus 516 through a decoder 511 and also coupled to the address bus 516 through an address input line 536. The read only memory 510 is coupled to the data bus 517 through a data output line 537.

The random access memory (RAM) 512 is to store work data to be used for data processing by the processing unit 503. The random access memory 512 is coupled to the address bus 516 through a decoder 513 and also coupled to the address bus 516 through an address input line 538. The random access memory 512 is coupled to the data bus 517 through a data input-output line 539.

The external bus interface 514 has a plurality of control input-output terminals 524, an external address bus 525 and an external data bus 526. The external bus interface 514 is coupled to the address bus 516 through a decoder 515 and also coupled to the address bus 516 through an address output line 540. The external bus interface 514 is further coupled to the data bus 517 through a data input-output line 541.

The parallel input-output port 506 will subsequently be described much more closely to explain problems with the parallel input-output port 506 in the parallel transmission. The parallel input-output port 506 comprises an integration of parallel input-output signal transmission lines, each of which transmits binary digit signals or a 0 signal and a 1 signal. It seems general that when a set of eight bits makes up data such as a character, the switching between the input and output may be conducted per eight bits. But, it may be possible to conduct the switching between the input and output per one bit, by a software stored in a register.

The parallel input-output port 506 comprises a register being able to retain binary signals. The processing unit 503 conducts the read-out or the write of the binary signals from or into the port 506. The parallel input-output port 506 at the input state allows the processing unit 503 to execute the read-out the binary state or "0"/"1" of the port 506. The parallel input-output port 506 at the output state permits the processing unit 503 to execute the write of the 8 bit data into the resister of the port 506.

In such the input-output ports, there is an input-output port for 24 bits in which a shift of the input and the output is conducted per 8 bits. The set of the input and output is conducted by setting a mode register.

The parallel input-output port physically comprises a private input port, a private output port and an input-output switchable port. The installation of the parallel input-output port in the single chip microcomputer requires a great number of private terminals. The number of pins allocated for the parallel input-output port is restricted by the total number of pins of the package which seals integrated circuits. Physically, it is necessary to have the pins allocated not only for the parallel input-output port but also for other units. For example, the parallel port and address terminals are so multiplexed as to reduce the number of pins. If the interface buses such as address bus or the data bus are used, it is impossible to use the parallel input-output port.

The size of the package and the number of pins are important factors of determining the cost of the integrated circuit. In view of the cost, it is of course desirable to reduce the number of pins of the package. On the other hand, the installation of the parallel input-output port in the single chip microcomputer, however, requires a great number of pins. In the prior art, it is therefore difficult to install the parallel input-output port in the single chip microcomputer.

Alternatively, there is a clock synchronous serial interface which is installed in the single chip microcomputer. The clock synchronous serial interface will be described with reference to FIGS. 2 and 3. The clock synchronous serial interface exhibits an analogous performance to that of the parallel input-output port. The clock synchronous serial interface includes a serial clock control circuit 614, a shift register 609 and a D-type flip-flop circuit 616. The shift register 609 is coupled to a data bus 610 which transmits 8 bit signals. The shift register 609 is also coupled to a serial data input signal line 601 through an input buffer 605 for receipt of a serial data input signal. The shift register 609 is further coupled to the D-type flip-flop circuit 616 at its input D-terminal. The serial clock control circuit 614 is coupled to a control input signal bus 615 for receipt of control signals such as a start signal. The serial clock control circuit 614 is coupled to an interrupt transfer complete output signal line 604 through an output buffer 608 for output of an interrupt transfer complete output signal INTSCI. The serial clock control circuit 614 is also coupled to the shift register 609 through a read enable signal line 613 for delivering a read enable signal RD to the shift register 609. The serial clock control circuit 614 is also coupled to the shift register 609 through a write enable signal line 612 for delivering a write enable signal WE to the shift register 609. The serial clock control circuit 614 is also coupled to the shift register 609 through a serial control clock signal line 611 for delivering a serial control clock signal SCLK to the shift register 609. The serial control clock signal line 611 is coupled to a serial synchronous clock signal output line 602 through an output buffer 606. The serial control clock signal line 611 is also coupled to the D-type flip-flop circuit 616 at its input terminal. The D-type flip-flop 616 is coupled at its output side to a serial data output signal line 603 on which an output buffer 607 is arranged.

The clock synchronous serial interface performs as a communication unit. Values or binary digit signals are transmitted through the data bus 610 to the shift register 609. The shift register 609 receives a value and then stores the same. Namely, the value comprising the binary digit is written into the shift register 609. Concurrently, the serial clock control circuit 614 generates the write enable signal WE for transmission thereof to the shift register 609 through the write enable signal line 612 thereby the serial clock control circuit 614 generates a serial control clock signal SCLK which will be delivered to the shift register 609 though the serial control clock signal line 611. The shift register 609 receives the serial control clock signal and then exhibits a serial shift of data. The serial data output signal SO is subsequently transmitted on the serial data output signal line 603 through the D-type flip-flop circuit 616 and the output buffer 607. Concurrently, the shift register 609 receives a serial data input signal SI being transmitted on the serial data input signal line 601 through the input buffer 605. That is how the serial shift of data is performed by the shift register 609. When the data transfer by the shift register 609 is completed, the serial clock control circuit 614 generates the interrupt transfer complete signal INTSCI and thus delivers the same on the interrupt transfer complete signal line 604 through the output buffer 608. When the transmission of all data is completed, the generation of the serial control clock SCLK by the serial clock control circuit 614 is completed. The wave-forms of the above signals and thus the serial control output clock signal CSLK 611, the serial data input signal SI, the serial data output signal SO and the interrupt transfer complete output signal INTCS are illustrated in FIG. 3. The clock synchronous serial interface is usable as an output port but an input port when the interrupt transfer complete output signal INTSCI serves as ENABLE signals for latch circuit. Namely, the serial clock synchronous interface is unable to serve as an input port. Further, the clock synchronous interface is engaged with a possibility of erasure of data from the shift register. It is therefore impossible to use the clock synchronous serial interface as the parallel input-output port.

SUMMARY OF THE INVENTION

Accordingly, it is a primary object of the present invention to provide a novel single chip microcomputer in which a parallel input-output port is installed.

It is a further object of the present invention to provide a novel parallel input-output port being installed in a single chip microcomputer.

The above and other objects, features and advantages of the present invention will be apparent from the following descriptions.

The invention provides a novel single chip microcomputer having an improved parallel input-output port in which a shift register with a parallel input port serves as input terminals and a shift register with a parallel output port and a latch serves as output terminals. The input and output shift registers are connected in series to each other through serial input-output terminals.

The parallel input-output port includes an external input shift register with a parallel input port and an external output shift register with a parallel output port having a latch circuit. The parallel input-output port also includes a plurality of internal port units coupled in series to each other. Each of the plural internal port units comprises a data register and a shift register coupled to the data register. Each of the data registers is coupled to an internal bus. The parallel input-output port also includes a serial input unit coupling the external output shift register with the shift register in the internal port unit existing at a terminal point of the internal port series. The parallel input-output port also includes a serial output unit coupling the external input shift register with each of the shift registers in the internal port units. The parallel input-output port also includes a control circuit coupled to both the external input and output shift registers for controlling shift performances of the external input and output shift registers.

BRIEF DESCRIPTION OF THE DRAWINGS

Preferred embodiments of the present invention will hereinafter fully be described in detail with reference to the accompanying drawings.

FIG. 2 is a block diagram illustrative of a clock synchronous serial interface in the prior art.

FIG. 3 is a timing chart of a clock signal and output signals of the clock synchronous serial interface illustrated in FIG. 2.

PREFERRED EMBODIMENTS OF THE INVENTION

Figure 1:
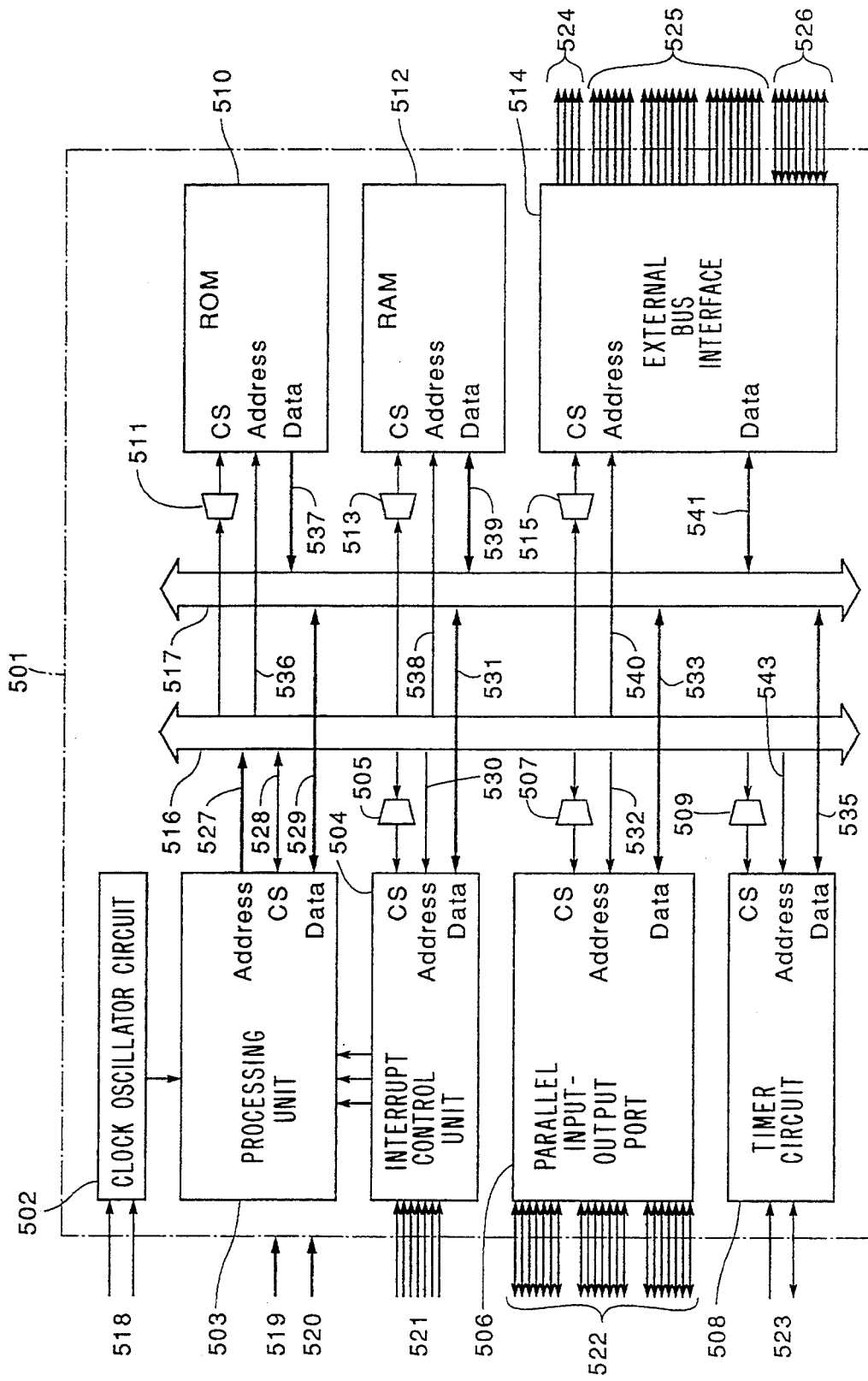
FIG. 1 is a circuit diagram illustrative of a single chip microcomputer involving a parallel input-output port in the prior art.

The invention provides a novel single chip microcomputer having an improved parallel port.

A first embodiment of the present invention will be described with reference to FIGS. 4, 5, 6 and 7.

A circuit structure of an improved parallel port which is involved in a novel single chip microcomputer will be described with reference to FIG. 4. The parallel port has a bi-directional internal bus 101 which transmits an 8 bit signal. The parallel port further includes four ports, and thus a PA port, a PB port, a PC port and a PD port. The parallel port further includes control registers 127 and 168 for 6 bit signals and a decoder circuit 130. A write enable signal line 128 couples the control register 127 and the decoder circuit 130 so as to transmit a WRITE ENABLE signal from the decoder circuit 130 to the control register 127. A write enable signal line 129 couples the control register 168 and the internal data bus 101 so as to transmit a WRITE ENABLE signal to the control register 168. The parallel port has a selector 164 which has four input terminals and one output terminal. The selector 164 is coupled to the control register 168 through port size indicating signal lines 167 and 168 which transmit port bit size indicating signals indicating 8 bits, 16 bits, 32 bits or 64 bits. The selector 164 receives the port bit size indicating signal and then selects any one of 8 bits, 16 bits, 32 bits and 64 bits according to the port bit size indicating signal.

The PD port has an output signal line 102 which is connected to the internal data bus 101 so as to transmit an 8 bit signal to the internal data bus 101. The PD port also has an output 3-state buffer 103 for 8 bits which is connected at its output side to the output signal line 102. A read enable signal line 104 couples the decoder circuit 130 and the output 3-state buffer 103 for transmitting a READ-ENABLE signal from the decoder circuit 130 to the output buffer 103. The PD port also has an input signal line 105 which couples a data latch 106 for 8 bit signals and the internal data bus 101. A data latch control signal line 107 couples the decoder circuit 130 and the data latch 106 at its input side for delivering a data latch control signal or a WRITE-ENABLE signal from the decoder circuit 130 to the data latch 106. The PD port also includes a data selector 131 for 8 bit signal, which has two input terminals and one output terminal. The output terminal of the data selector 131 is connected through a read-out line 132 to the output 3-state buffer 103 for transmitting 8 bit signals to the output buffer 103. One of the two input terminals of the data selector 131 is coupled through an output mode data read-out line 135 to the output terminal of the data latch 106. Another of the two input terminals of the data selector 131 is coupled through an input mode data read-out line 134. An input-output switch signal line 133 couples the control register 127 and the data selector 131 for allowing the decoder circuit 130 to supply an input-output switch signal to the data selector 131. The PD port also includes a shift register 156 with parallel input-output terminals for 8 bit signals. The shift register 156 has an output terminal coupled through the input mode data read-out line 134 to the input terminal of the data selector 131. The shift register 156 has an input terminal coupled through the output mode data read-out line 135 to the output side of the data latch 106. The shift register 156 has input terminals coupled to the decoder circuit 130 through both a parallel data load signal line 151 and a data shift signal line 152. The shift register 156 further has an input terminal coupled through a clock signal line 169 to the internal data bus 101. The shift register 156 is coupled to the selector 164 through a 64 bit serial output data line 163.

The PC port has an output signal line 109 which is connected to the internal data bus 101 so as to transmit an 8 bit signal to the internal data bus 101. The PC port also has an output 3-state buffer 108 for 8 bits which is connected at its output side to the output signal line 109. A read enable signal line 110 couples the decoder circuit 130 and the output 3-state buffer 108 for transmitting a READ-ENABLE signal from the decoder circuit 130 to the output buffer 108. The PC port also has an input signal line 105 which couples a data latch 111 for 8 bit signals and the internal data bus 101. A data latch control signal line 113 couples the decoder circuit 130 and the data latch 111 at its input side for delivering a data latch control signal or a WRITE-ENABLE signal from the decoder circuit 130 to the data latch 111. The PC port also includes a data selector 136 for 8 bit signal, which has two input terminals and one output terminal. The output terminal of the data selector 136 is connected through a read-out line 137 to the output 3-state buffer 108 for transmitting 8 bit signals to the output buffer 108. One of the two input terminals of the data selector 136 is coupled through an output mode data read-out line 140 to the output terminal of the data latch 141. Another of the two input terminals of the data selector 136 is coupled through an input mode data read-out line 139. An input-output switch signal line 138 couples the control register 127 and the data selector 136 for allowing the control register 127 to supply an input-output switch signal to the data selector 136. The PC port also includes a shift register 157 with parallel input-output terminals for 8 bit signals. The shift register 157 has an output terminal coupled through the input mode data read-out line 139 to the input terminal of the data selector 136. The shift register 157 has an input terminal coupled through the output mode data read-out line 140 to the output side of the data latch 111. The shift register 157 has input terminals coupled to the decoder circuit 130 through both the parallel data load signal line 151 and the data shift signal line 152. The shift register 157 further has an input terminal coupled through the clock signal line 169 to the internal data bus 101. The shift register 157 is coupled to the selector 164 through a 32 bit serial output data line 162.

The PB port has an output signal line 115 which is connected to the internal data bus 101 so as to transmit a 8 bit signal to the internal data bus 101. The PB port also has an output 3-state buffer 114 for 8 bits which is connected at its output side to the output signal line 115. A read enable signal line 116 couples the decoder circuit 130 and the output 3-state buffer 114 for transmitting a READ-ENABLE signal from the decoder circuit 130 to the output buffer 114. The PB port also has an input signal line 118 which couples a data latch 117 for 8 bit signals and the internal data bus 101. A data latch control signal line 119 couples the decoder circuit 130 and the data latch 117 at its input side for delivering a data latch control signal or a WRITE-ENABLE signal from the decoder circuit 130 to the data latch 117. The PB port also includes a data selector 141 for 8 bit signal, which has two input terminals and one output terminal. The output terminal of the data selector 141 is connected through a read-out line 142 to the output 3-state buffer 114 for transmitting 8 bit signals to the output buffer 114. One of the two input terminals of the data selector 141 is coupled through an output mode data read-out line 145 to the output terminal of the data latch 117. Another of the two input terminals of the data selector 141 is coupled through an input mode data read-out line 144. An input-output switch signal line 143 couples the control register 127 and the data selector 141 for allowing the control register 127 to supply an input-output switch signal to the data selector 141. The PB port also includes a shift register 158 with parallel input-output terminals for 8 bit signals. The shift register 158 has an output terminal coupled through the input mode data read-out line 144 to the input terminal of the data selector 141. The shift register 158 has an input terminal coupled through the output mode data read-out line 145 to the output side of the data latch 117. The shift register 158 has input terminals coupled to the decoder circuit 130 through both the parallel data load signal line 151 and the data shift signal line 152. The shift register 158 further has an input terminal coupled through the clock signal line 169 to the internal data bus 101. The shift register 158 is coupled to the selector 164 through a 16 bit serial output data line 161.

The PA port has an output signal line 121 which is connected to the internal data bus 101 so as to transmit a 8 bit signal to the internal data bus 101. The PA port also has an output 3-state buffer 120 for 8 bits which is connected at its output side to the output signal line 121. A read enable signal line 123 couples the decoder circuit 130 and the output 3-state buffer 120 for transmitting a READ-ENABLE signal from the decoder circuit 130 to the output buffer 120. The PA port also has an input signal line 125 which couples a data latch 124 for 8 bit signals and the internal data bus 101. A data latch control signal line 126 couples the decoder circuit 130 and the data latch 124 at its input side for delivering a data latch control signal or a WRITE-ENABLE signal from the decoder circuit 130 to the data latch 124. The PA port also includes a data selector 146 for 8 bit signal, which has two input terminals and one output terminal. The output terminal of the data selector 146 is connected through a read-out line 147 to the output 3-state buffer 120 for transmitting 8 bit signals to the output buffer 120. One of the two input terminals of the data selector 146 is coupled through an output mode data read-out line 150 to the output terminal of the data latch 124. Another of the two input terminals of the data selector 146 is coupled through an input mode data read-out line 149. An input-output switch signal line 148 couples the control register 127 and the data selector 146 for allowing the control register 127 to supply an input-output switch signal to the data selector 146. The PA port also includes a shift register 159 with parallel input-output terminals for 8 bit signals. The shift register 159 has an output terminal coupled through the input mode data read-out line 149 to the input terminal of the data selector 146. The shift register 159 has an input terminal coupled through the output mode data read-out line 150 to the output side of the data latch 124. The shift register 159 has input terminals coupled to the decoder circuit 130 through both the parallel data load signal line 151 and the data shift signal line 152. The shift register 159 further has an input terminal coupled through the clock signal line 169 to the internal data bus 101. The shift register 159 is coupled to the selector 164 through an 8 bit serial output data line 160.

The selector 164 is coupled at its output terminal through a drive buffer 165 to an external shift register 180 at its input terminal. The external shift register 180 is an output shift register such as TTL-IC 74LS594. The selector 164 selects any one of the bit lengths and then delivers signals comprising the selected bits through the drive buffer 165 to the external shift register 180. The clock signal from the internal data bus 101 is transmitted through the clock signal line 169 and a clock signal line 171 to an output buffer 176. The output buffer 176 delivers the clock signal through a clock output line 183 to an external shift register 181. The external shift register 181 is an input shift register such as TTL-IC 74LS166. The decoder circuit 130 is coupled through a data latch signal line 153 to an output buffer 177. The output buffer 177 is coupled through an output data latch control signal line 184 to both the external shift registers 180 and 181 for delivering an output data latch control signal. The decoder circuit 130 is also coupled through a shift stop signal line 154 to an output buffer 178. The output buffer 178 is coupled through a shift register control signal line 185 to the external shift register 181 for delivering a shift register control signal to the external shift register 181. The decoder circuit 130 is also coupled through a data read control signal line 155 to an output buffer 179. The output buffer 179 is coupled through a data read control signal line 186 to the external shift register 181 for delivering a data read control signal to the external shift register 181. The decoder circuit 130 delivers an output port data latch signal 172 through the output buffer 177 to both the external shift registers 180 and 181. The decoder circuit 130 also delivers a data hold signal 173 through the output buffer 178 to the external shift register 181. The decoder circuit 130 also delivers a data hold signal 174 through the output buffer 179 to the external shift register 181. The external shift register 181 is coupled to the shift register 159 through serial data input signal lines 170 and 182 and an input buffer 175 for receipt of serial data signal transmitted from the external shift register 181.

The operation of the novel single chip microcomputer having the improved parallel port of the first embodiment will subsequently be described with reference to FIG. 5 which is a schematic block diagram of the parallel port of the novel single chip microcomputer illustrated in FIG. 4. The parallel port comprises four ports and thus the PA port, the PB port, the PC port and the PD port. The improved parallel port provided by the first embodiment according to the present invention is available for various bit lengths in the range from 8 bits to 32 bits. Namely, the parallel port comprises the above four ports so as to become applicable for each of 8 bits, 16 bits, 24 bits and 32 bits. Each of the four ports or the PA port, the PB port, the PC port and the PD port operates 8 bit signals. Thus, each of the four parallel ports is allocated with 8 bits so as to allow its shift performance between input and output per 8 bits. The parallel port has an internal bus 201 for transmitting data, address and control signals. The PA port comprises a data register 209 coupled to the internal data bus 201 and a shift register 208 coupled to the data register 209. The PB port comprises a data register 207 coupled to both the internal data bus 201 and the data register 209 in the PA port and a shift register 206 coupled to both the data register 207 and the shift register 208 in the PA port. The PC port comprises a data register 205 coupled to both the internal data bus 201 and the data register 207 in the PB port and a shift register 204 coupled to both the data register 205 and the shift register 206 in the PB port. The PD port comprises a data register 203 coupled to both the internal data bus 201 and the data register 205 in the PC port and a shift register 202 coupled to both the data register 203 and the shift register 204 in the PC port. In the first embodiment, the PA port serves as an input private port for 8 bits but the PB port serves as an output private port for 8 bits. Both the PC port and the PD port are not used. Thus, a half of the registers installed in the parallel port is not used.

Figure 5:
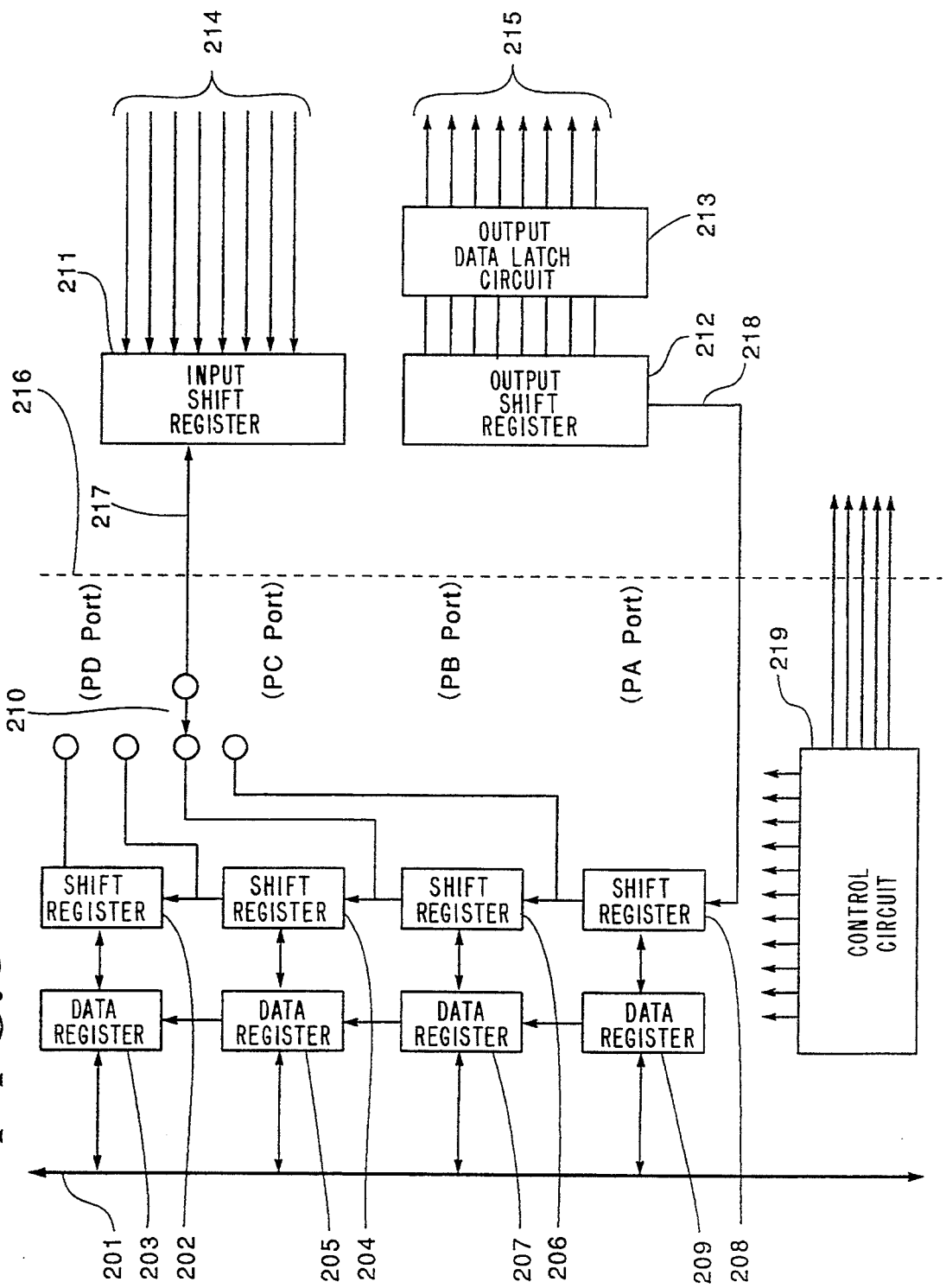
FIG. 5 is a fragmentary block schematic diagram of a novel single chip microcomputer illustrated in FIG. 4.

In FIG. 5, the internal circuit of the parallel port comprising the above four parallel ports is expressed at left side of a boundary line 216 but an external circuit is expressed at right side of the boundary line 216. The data registers 203, 205, 207 and 209 are accessible to a processing unit (not shown) through the internal interface bus 201. The shift registers 202, 204, 206 and 208 are to execute sequential receipt or delivery of data from an external input port for 8 bits or toward an external output port for 8 bits. The parallel port has a selector 210 which selects any one of the port sizes according to a port size of an external input or output port. The selector 210 is shown in FIG. 5 as selecting 16 bit size. The internal circuit of the parallel port has a control circuit 219 which controls the data registers 203, 205, 207 and 209 and the shift registers 202, 204, 206 and 208 as well as the external input and output ports.

The selector 210 in the internal circuit of the parallel port is coupled to an external input shift register 211 in the external circuit through a serial output port 217. The input shift register 211 is for an input port 214 of 8 bits. The external circuit has an output shift register 212 which is coupled to the shift register 208 in the PA port through a serial input port 218. The output shift register 212 for an output port 215 is coupled through an output data latch circuit 213 to the output port 215. The output data latch circuit 213 may comprise a flip-flop circuit.

Figure 4:
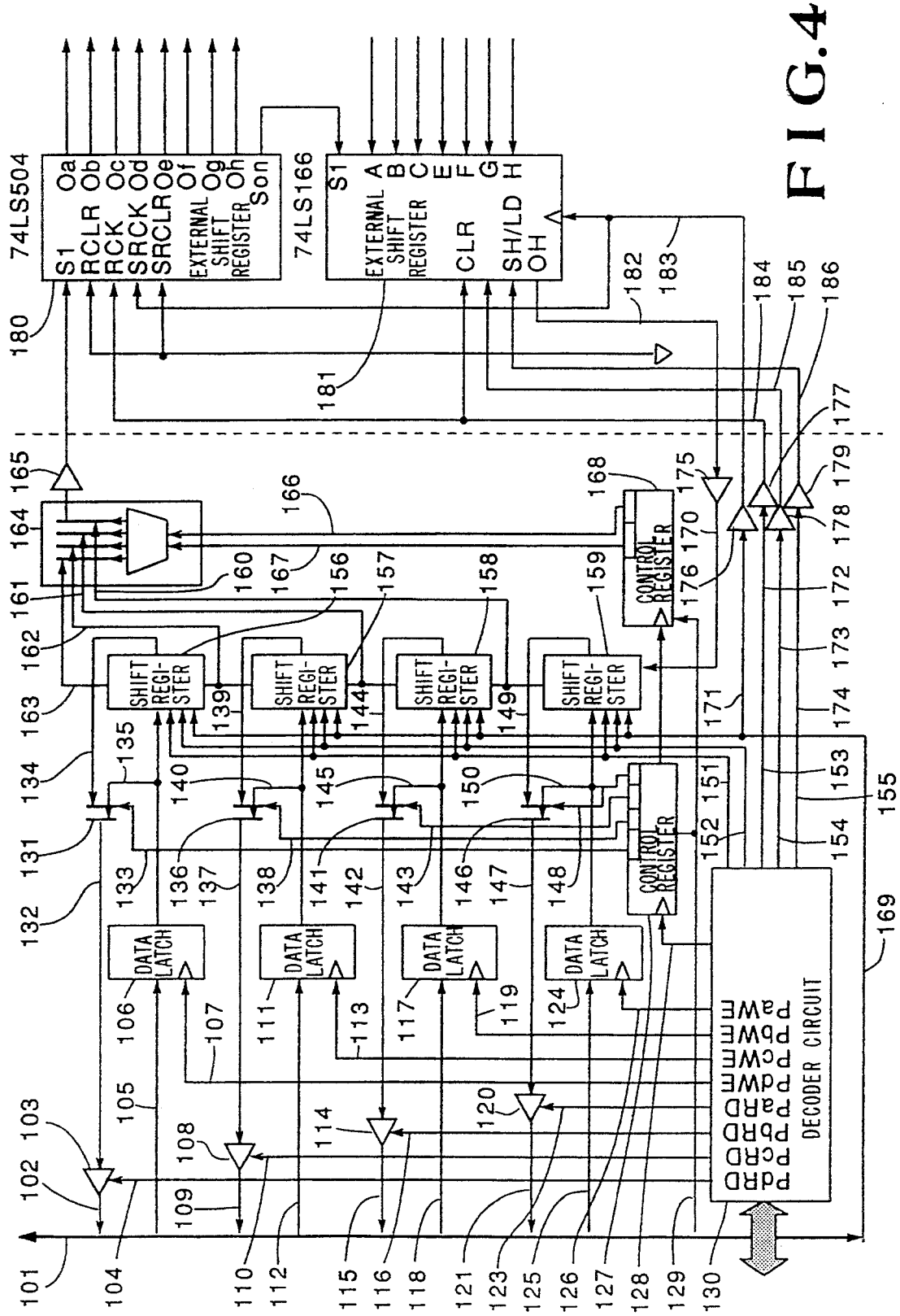
FIG. 4 is a fragmentary circuit diagram illustrative of a novel single chip microcomputer having an improved parallel input-output unit in a first embodiment according to the present invention.

As described above, the circuit structure expressed by the block diagram in FIG. 5 corresponds to the circuit structure in FIG. 4. The correspondence of each unit or element in the parallel port will subsequently be described. The data register 209 of the PA port comprises the data latch 124, the data selector 146 and the output 3-state buffer 120 expressed in FIG. 4. The shift register 208 of the PA port corresponds to the shift register 159 expressed in FIG. 4. The data register 207 of the PB port comprises the data latch 117, the data selector 141 and the output 3-state buffer 114 expressed in FIG. 4. The shift register 206 of the PB port corresponds to the shift register 158 expressed in FIG. 4. The data register 205 of the PC port comprises the data latch 111, the data selector 136 and the output 3-state buffer 108 expressed in FIG. 4. The shift register 204 of the PC port corresponds to the shift register 157 expressed in FIG. 4. The data register 203 of the PD port comprises the data latch 106, the data selector 131 and the output 3-state buffer 103 expressed in FIG. 4. The shift register 202 of the PD port correspond to the shift register 156 expressed in FIG. 4. The input shift register 211 corresponds to the shift register 181 which comprises the 74LS166. The output shift register 212 and the output data latch circuit 213 corresponds to the shift register which comprises 74LS504. Both the shift registers 211 and 212 are coupled through a signal line but which is not illustrated.

The operation of the parallel port of the first embodiment will be described with reference to FIG. 5.

The operation of the parallel port serving as an output port will be described. The selector 210 selects the PB port which is so set as to perform as output port. The processing unit which is not illustrated executes a write operation of output values into the data register of 207 of the PB port through the internal bus 201. When the data register 207 stores the data about output values, a sequencer is activated. The sequencer serves to have transmit respective data stored in the data registers 203, 205, 207 and 209 into the shift registers 202, 204, 206 and 208 for being sequentially shifted thereby. The shifted data is then transmitted through the selector 210 to the external input shift register 211. When the data of the shift register 206 are then transmitted to the output shift register 212, the data is transmitted to the output data latch circuit 213. After that, the data is delivered to an external register which is not illustrated. That is how the parallel port of the first embodiment performs as the output port which transmits the data stored into the register in the single chip microcomputer toward an external register.

The operation of the parallel port serving as an input port will be described. In this case, values are stored into the PA port which is so set as to serve as the input port. The processing unit executes data from the data register 209 of the PA port through the internal bus 201. At that time, the processing unit conducts an access to the sequencer and then receives a wait instruction from the sequencer so as to wait for processing data until the data is set. The sequencer also transmits a READ-ENABLE signal to the external input shift register 211 which will conduct a read performance from the input port 214. The sequencer subsequently transmits a shift signal to the external input shift register 211 storing the data from the input port 214. The input shift register 211 receives the shift signal and then shifts the data to the output shift register 212. The shifted data is then transmitted through the serial input port 218 to the shift register 208 of the PA port. After the shift register 208 receives the data from the serial input port 218, the sequencer makes the shift register transmit the input data through the data register 209 of the PA port to the internal bus 201. Concurrently, the sequencer transmits a wait release signal to the processing unit so as to cause the processing unit to initiate the processing of data. That is how the parallel port of the first embodiment performs as the input port.

Figure 6:
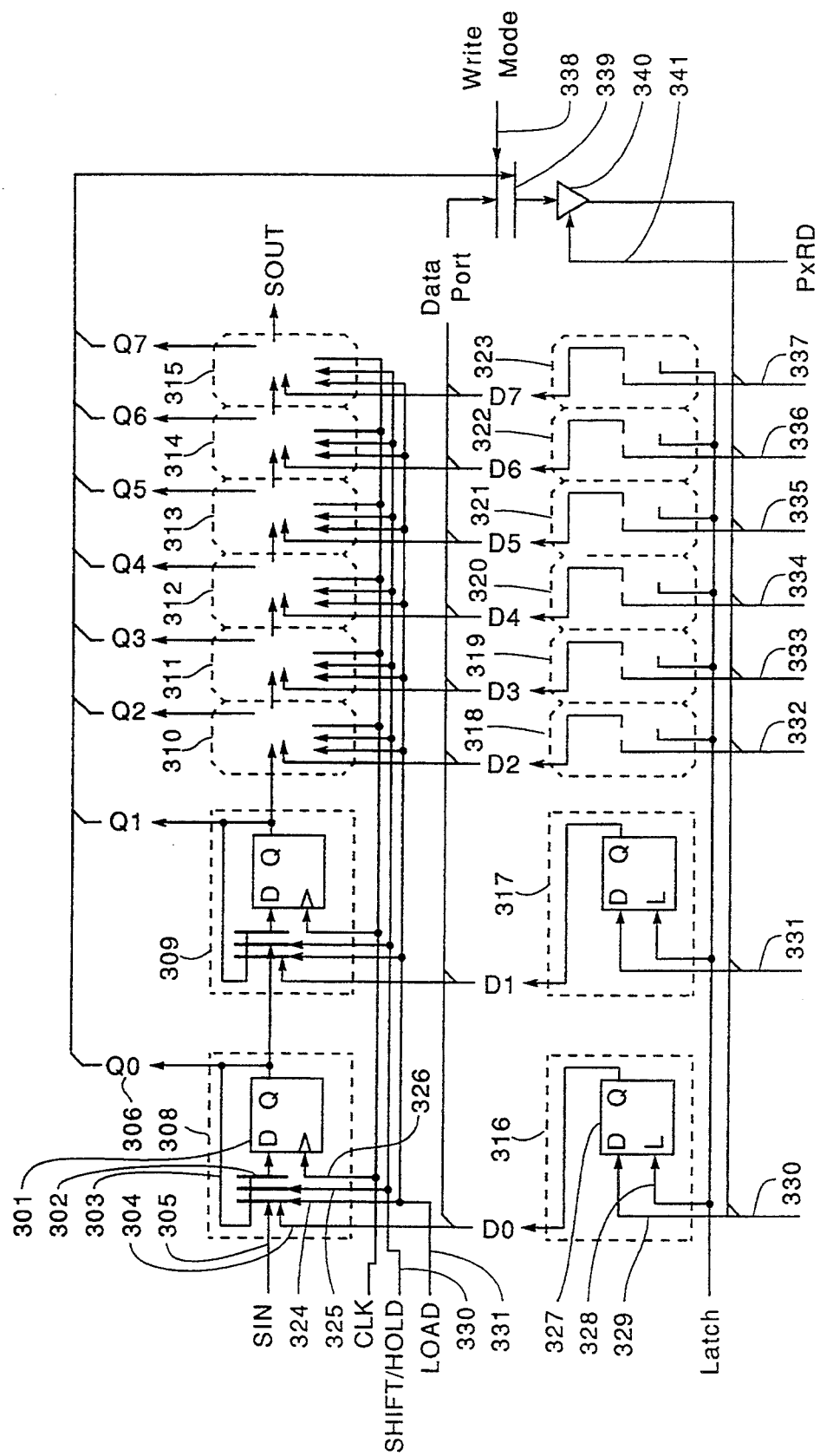
FIG. 6 is a circuit diagram illustrative of a shift register involved in a novel single chip microcomputer illustrated in FIG. 4.

The circuit structure of the shift registers 202, 204, 206 and 208 and the data registers 203, 205, 207 and 209 will subsequently be described in detail with reference to FIG. 6 to understand the parallel port much more closely. FIG. 6 illustrates the circuit structure of each of the parallel ports, and thus the PA port, the PB port, the FC port and the PD port. FIG. 6 illustrates the circuit of each of the four sets of the shift registers and the data registers.

Each of the shift registers comprises a set of eight units 308, 309, 310, 311, 312, 313, 314 and 315, each of which is for 1 bit. Thus, the set of the eight units 308 to 315 is for 8 bits as each of the shift registers operates the 8 bit signal.

Each of the units 308 to 315 of the shift register further comprises both an edge trigger type of a D flip-flop 301 and a selector 302 for 1 bit having three input terminals and one input terminal. The output terminal of the selector 302 is coupled to a D input terminal of the D flip-flop 301. The three terminals of the selector 302 are coupled to a data hold signal line 303, a parallel data hold signal line 304 and a right shift signal line 305 respectively. The selector 302 is also coupled to a load signal line 324 and a shift/hold signal line 325 for receipt of a load signal and a shift/hold signal so that the selector 302 selects any one of the data hold signal line 303, the parallel data hold signal line 304 and the right shift signal line 304 according to the load signal or the shift/hold signal.

The operation of each of the eight units 308 to 315 is as follows. When the load signal is "1" and the shift/hold signal is "1" or "0", the selector 302 selects the parallel data hold signal line 304 and then transmits the parallel data hold signal to the D flip-flop 301 thereby the parallel input is accomplished. When the load signal is "0" and the shift/hold signal is "1", the selector 302 selects the right shift signal line 305 and then transmits the right shift signal to the D flip-flop 301 thereby the serial input is accomplished. When the load signal is "0" and the shift/hold signal is also "0", the selector 302 selects the data hold signal line 303 and then transmits the output of the D flip-flop 301 to the D flip-flop 301. The D flip-flop 301 is coupled to a clock signal line 326 for receipt of a clock signal for its synchronous operation under the clock signal.

The operation of the set of the eight units 308 to 315 is as follows. When the load signal is "1" and the shift/hold signal is "1" or "0", the shift register exhibits the parallel input read performance. When the load signal is "0" and the shift/hold signal is "1", the shift register exhibits the right shift performance of the data. When the load signal is "0" and the shift/hold signal is also "0", the shift register supports the current value.

Each of the data registers comprises a set of eight latches 316, 317, 318, 319, 320, 321, 322 and 323, each of which is for 1 bit. Thus, the set of the eight latches 316 to 323 is for 8 bits as each of the data registers operates the 8 bit signal.

Each of the latches 316 to 323 of the data register further comprises a D flip-flop 327. The output terminal of the D flip-flop 327 is coupled to the selector 302 through the parallel data hold signal line 304. The D flip-flop 327 is coupled at its D terminal to a latch data line 329 and coupled at its L terminal to a latch control signal line 328. The latch data line 329 is coupled to the internal bus through a data line 330.

The operation of each of the latches 316 to 323 is as follows. When the latch control signal is "1", the D flip-flop 316 exhibits a continuous output of the same signal as the latch data from the latch data line 329. When the latch control signal is "0", the D flip-flop 316 exhibits a continuous output of the same signal as a signal which appears when the latch control signal changes from "1" to "0".

With reference back to FIG. 4, in the port for write operation, values are stored in the respective data latches 106, 111, 117 and 124, and then transmitted to the shift registers 156, 157, 158 and 159. After that, the values are further transmitted to the selector 164 for a sequential transmission of the data toward the external shift registers. According to the read instruction from the processing unit, the read-out of the values is implemented from the data latches 106, 111, 117, 124 through both any one of pairs of the data selectors 131, 136, 141 and 146 and the output buffers 103, 108, 114 and 120. The read-out performance is implemented for the current value and thus the last stored value.

In the port for read operation, when the read-out instruction appears from the processing unit, data are transmitted from the external shift register through the serial data input terminal to the internal shift registers 156, 157, 158 and 159. After that, the data are transmitted through the data selectors 131, 136, 141 and 146 and further the output state buffers 103, 108, 114 and 120 to the internal data bus 101.

Figure 7:
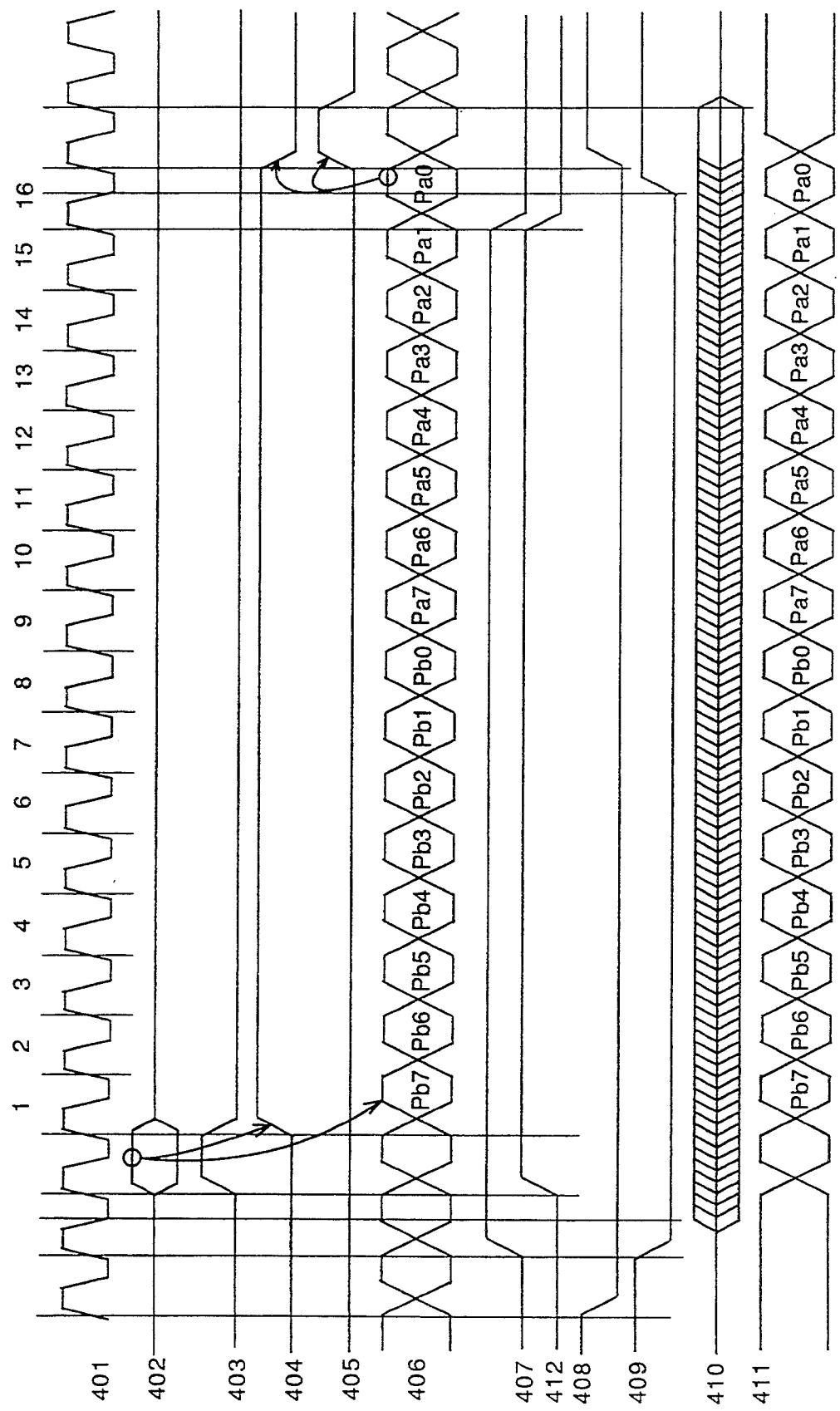
FIG. 7 is a timing chart of a circuit of a single chip microcomputer illustrated in FIG. 4.

With reference to FIG. 7, the read operation from the parallel port is different from the write operation into the parallel port. To describe the operation, it is assumed that the write operation of data into the output port is executed to the PA port and the read operation of data from the input port is executed to the PB port. A clock signal 401 is for the synchronous operation of the single chip microcomputer. Namely, other signals synchronize with the clock signal 401. An access signal 402 is a signal for an access of the processing unit to the internal bus. The access signal appears as data on the internal data bus 101 in FIG. 4 and serves as a write access signal to the PA port. A latch signal 403 is for the data latches 106, 111, 117 and 124. The latch signal 403 serves as a control signal of the write operation of data into the port. The latch signal 403 is obtainable by decoding address. The latch control signal appearing on the latch control signal line 126 has the same timing as the timing of the latch signal 403. A shift control signal 404 is a signal for the external shift register. A latch enable signal 405 is for the external latch. A serial output timing 406 is a signal indicating a timing of a write operation of data into the port.

When the latch signal 403 takes the "1" level, the data latch 124 receives data and then outputs the same. The data is transmitted from the internal data bus 101 through the input bus 125 and the data latch 124 to the input terminal of the shift register 159. The latch signal 403 is supplied as the write enable signal "LOAD"

indicating the timing of the parallel data write operation of the shift register 159. The latch signal 403 serves as an access signal causing the sequencer to be activated thereby the shift control signal 404 is generated according to the number of port bits. The shift control signal is supplied as the SHIFT/HOLD signal by which the serial output of the data stored in the port is accomplished. The serial output timing indicates the output timing of each of the 8 bits. When all of the 8 bit signals are outputted, the latch signal 403 is generated and the write operation of the data into the external latch is executed.

A shift control signal 407 is a signal which supplies a timing of a shift stop operation of the external input shift register. A shift control signal 412 is a signal which controls a shift/load operation of the external shift register. A read signal 408 is a signal for a read operation by the processing unit from the register. A wait signal 409 is a signal which forces the processing unit to wait its operation. An internal bus output signal 410 indicates the transmission of data into the internal data bus. A serial input timing 411 supplies the timing of the read operation of the data from the input port.

When the shift control signals 407 and 412 take a "1" level and a "0" level respectively, the read operation of the data from the parallel input terminal of the shift register is conducted. When the shift control signal 412 takes a "1" level, the shift operation of the data is initiated for capturing the data into the internal circuit. When capturing all data is completed, the read operation of the data from the port is also completed.

In the single chip microcomputer provided by the first embodiment according to the present invention, it is necessary to use four pins only for the input-output port for 8 bit or more. In the conventional single chip microcomputer, it is necessary for the 64 bit input-output port to use sixty four pins and thus the same number of pins as the bit numbers. This forces a number of pins in the package to be shared for the parallel port. The increase of the number of pins in the package is restricted by physical factors. A package having a large number of pins causes a rise of the cost of LSI. That is because it seems impossible to install the parallel port for 64 bits in the single chip microcomputer. On the other hand, the novel single chip microcomputer provided by the first embodiment according to the present invention allows the number of required pins to be reduced substantially. The present invention is applicable to a parallel port for 64 bits or more in the single chip microcomputer.

A second embodiment of the present invention will be described with reference to FIG. 8.

A circuit structure of an improved parallel port which is involved in a novel single chip microcomputer will be described with reference to FIG. 8.

The parallel port comprises four ports and thus the PA port, the PB port, the PC port and the PD port. The improved parallel port provided by the second embodiment according to the present invention is available for various bit sides. Each of the four ports or the PA port, the PB port, the PC port and the PD port corresponds to 8 bits. Thus, each of the four parallel ports is allocated with 8 bits. The parallel port has an internal bus 801. The internal bus 801 is to transmit data, address and control signals. The PA port comprises a data register 809 coupled to the internal bus 801 and a shift register 808 coupled to the data register 809. The PB port comprises a data register 807 coupled to both the internal bus 801 and the data register 809 in the PA port and a shift register 806 coupled to both the data register 807 and the shift register 808 in the PA port. The PC port comprises a data register 805 coupled to both the internal bus 801 and the data register 807 in the PB port and a shift register 804 coupled to both the data register 805 and the shift register 806 in the PB port. The PD port comprises a data register 803 coupled to both the internal bus 801 and the data register 805 in the PC port and a shift register 802 coupled to both the data register 803 and the shift register 804 in the PC port.

Figure 8:
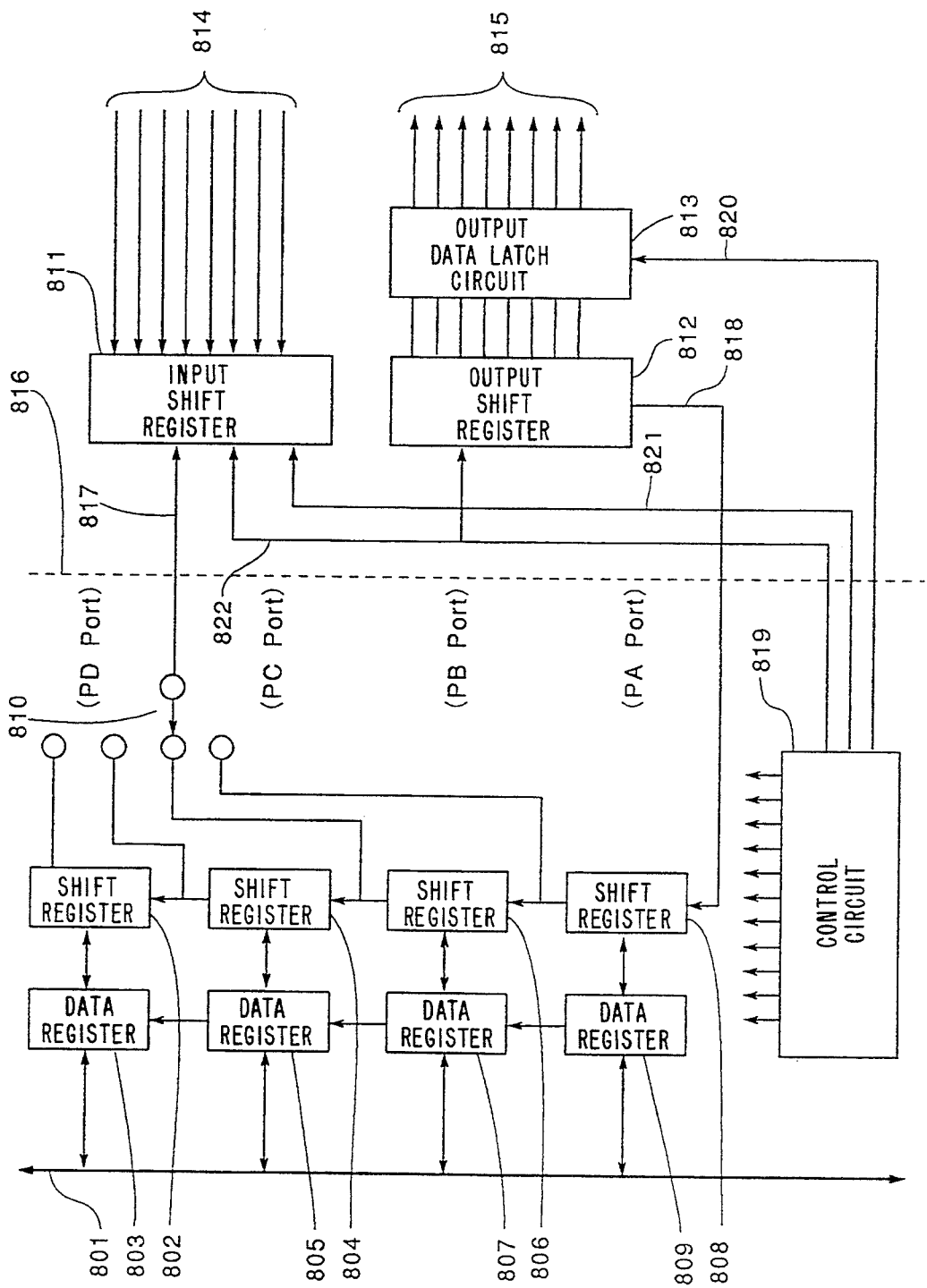
FIG. 8 is a fragmentary block schematic diagram of a novel single chip microcomputer in a second embodiment according to the present invention.

In FIG. 8, the internal circuit of the parallel port comprising the above four parallel ports is expressed at left side of a boundary line 816 but an external circuit is expressed at right side of the boundary line 816. The parallel port has a selector 810 which selects any one of the port sizes according to a port size of an external input or output port. The internal circuit of the parallel port has a control circuit 819 which controls the data registers 803, 805, 807 and 809 and the shift registers 802, 804, 806 and 808 as well as the external input and output ports.

The selector 810 in the internal circuit of the parallel port is coupled to an external input shift register 811 in the external circuit through a serial output port 817. The input shift register 811 is for an input port 814 of 8 bits. The external circuit has an output shift register 812 which is coupled to the shift register 808 in the PA port through a serial input port 818. The output shift register 812 for an output port 815 is coupled through an output data latch circuit 813 to the output port 815. The output data latch circuit 813 may comprise a flip-flop circuit. The control circuit 819 is coupled to the output data latch circuit 813 through an input latch signal line 820 which transmits an input latch signal from the control circuit 819 to the output data latch circuit 813. The control circuit 819 is coupled to the input shift register 811 through an output latch signal line 821 which transmits an output latch signal from the control circuit 819 to the input shift register 811. The control circuit 819 is also coupled to the input shift register 811 through a shift clock signal line 821 which transmits a shift clock signal from the control circuit 819 to the input shift register 811.

The circuit structure of the parallel port provided by the second embodiment according to the present invention is the same as those of the first embodiment, except for the input latch signal line 820, the output latch signal line 821 and the clock signal line 822. According to the input latch signal, the output latch signal and the clock signal, the circulation of data between the internal shift registers 806 and 808 and the external shift registers 811 and 812 are achieved thereby data stored in the external register becomes the same as data stored in the internal register. The access for read operation or write operation is conducted to the internal register only. Since the circuit structure and operation of the parallel port provided by the second embodiment are the same as those of the first embodiment, detail descriptions of the structure and operation of the parallel port of the second embodiment will be omitted.

In the single chip microcomputer provided by the present invention, it is necessary to use four pins only for the input-output port for 8 bits or more. In the conventional single chip microcomputer, it is necessary for the 64 bit input-output port to use sixty four pins and thus the same number of pins as the bit numbers. This forces a number of pins in the package to be shared for the parallel port. The increase of the number of pins in the package is restricted by physical factors. A package having a large number of pins causes a rise of the cost of LSI. That is because it seems impossible to install the parallel port for 64 bits in the single chip microcomputer. On the other hand, the novel single chip microcomputer provided by the second embodiment according to the present invention allows the number of required pins to be reduced substantially. The present invention is applicable to a parallel port for 64 bits or more in the single chip microcomputer.

The present invention further provides the following advantages. The novel parallel port allows the single chip microcomputer to have a large freedom of the number of ports. Namely, the novel parallel port is applicable for various bit numbers. In the prior art, the number of ports is predetermined under a type of the single chip microcomputer. When a larger number of ports than the predetermined number of ports is required, it is necessary to prepare an additional port in the exterior or to select another suitable port. The novel parallel port provides the substantial simplification of the additional external circuit thereby the minimization of the single chip microcomputer and the reduction of the cost are improved.

Whereas modifications of the present invention will no doubt be apparent to a person having ordinary skill in the art, to which the invention pertains, it is to be understood that the embodiments shown and described by way of illustrations are by no means intended to be considered in a limiting sense. Accordingly, it is to be intended to cover by claims all modifications which fall within the sprit and scope of the invention.

What is claimed is:

1. A parallel input-output circuit for a single chip microcomputer, said circuit comprising:
    a parallel input shift register disposed externally of a single chip microcomputer,
    a parallel output shift register disposed externally of said single chip microcomputer,
    a plurality of port units disposed internally of said single chip microcomputer and connected in series to each other, each said internal port unit comprising a data register and a shift register,
    an internal bus to which each of said internal port units is connected, and an internal processing unit connected to said internal bus, and
    a single internal switching device for selectively connecting an output of any selected one of said plurality of internal port units to said external parallel input shift register,
    wherein one of said plurality of internal port units is connected to said external parallel output shift register,
    whereby control signals transmitted through said internal bus from said internal processing unit are individually received and shifted in signal phases by said plurality of internal port units, whereafter said switching device transmits said shifted control signals from a selected one of said internal port units to said external parallel input shift register.

2. The parallel input-output circuit according to claim 1, further comprising an internal control circuit connected to said internal bus, said plurality of internal port units and said external parallel input and output shift registers, for controlling data transmissions between said plurality of internal port units and said external parallel input and output shift registers.

* * * * *